March 19, 1929.  A. G. RONNING ET AL  1,706,256
COMBINATION TRACTOR GRADER
Filed March 12, 1921   2 Sheets-Sheet 1
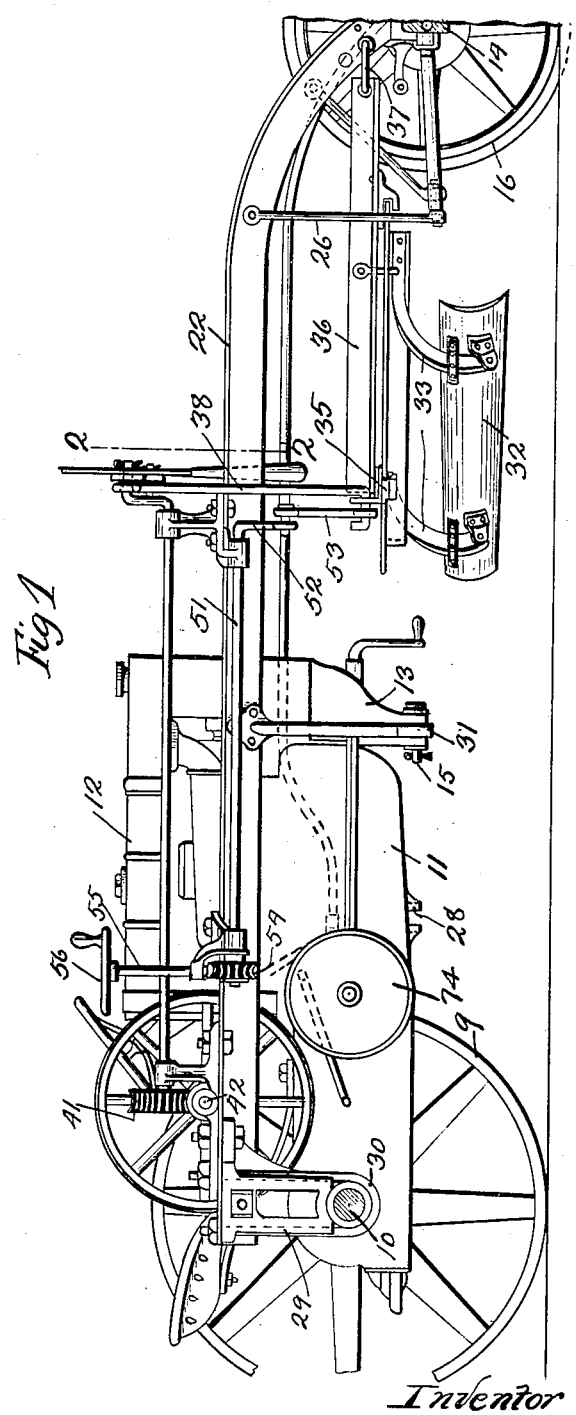
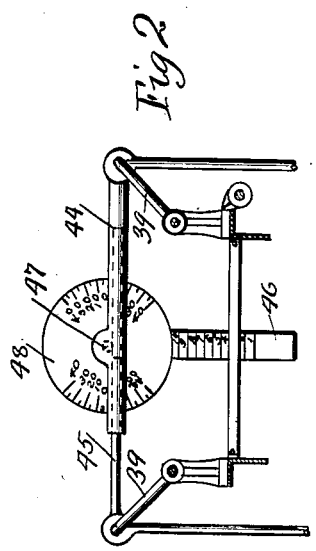
Inventor
Andrean G. Ronning
Adolph Ronning
By their Attorneys

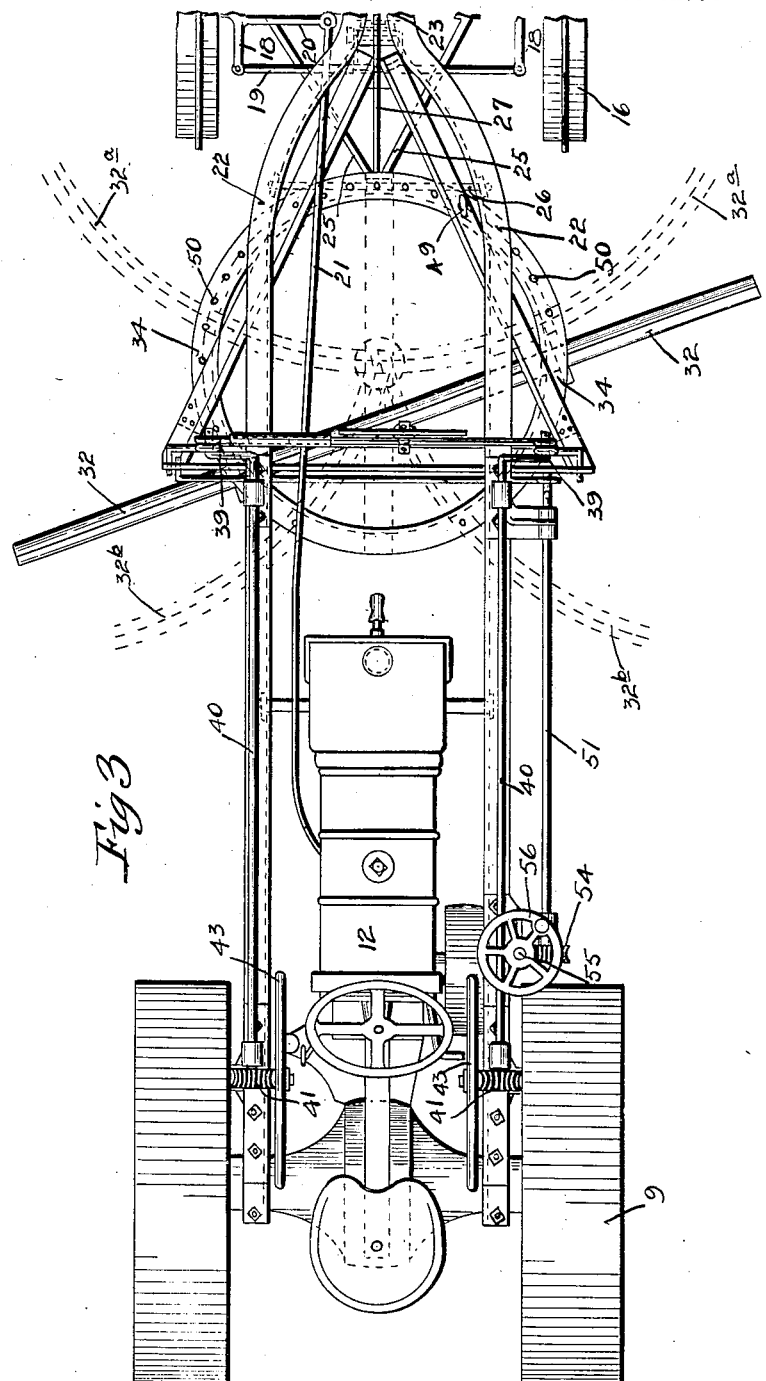

Patented Mar. 19, 1929.

1,706,256

UNITED STATES PATENT OFFICE.

ANDREAN G. RONNING AND ADOLPH RONNING, OF MINNEAPOLIS, MINNESOTA, ASSIGNORS TO RONNING MACHINERY COMPANY, OF MINNEAPOLIS, MINNESOTA, A CORPORATION OF MINNESOTA.

COMBINATION TRACTOR GRADER. REISSUED

Application filed March 12, 1921. Serial No. 451,746.

This invention relates to road maintaining equipment, and the main object is to provide a combination tractor grader, in which a grader mechanism attachment is applied to a standard form of tractor in such a manner that they form substantially a single machine, and in which machine the grader and tractor controls are all preferably brought to within reach of a single operator, whereby such an operator may have the entire machine under observation and control, so that he can not only conveniently watch the road and steer the machine, but can also control the position of the scraper blade and the speed of the machine. A further object is to render the grader frame attachment readily attachable and detachable with respect to the tractor, so that the tractor can be conveniently used for other purposes when so desired. A further object is to secure the grader frame in alignment with the tractor so that the weight of the tractor will supplement the weight of the grader mechanism in resisting the normal tendency of the dirt to move the angularly disposed grader blade transversely with respect to the direction of travel. A further object is to provided a grader attachment for a tractor in which the grader mechanism, while readily applied and detached, is so constructed that when attached to the tractor it will supplement the weight of the latter so as to greatly increase the traction effect of the traction members of the tractor. A further and more specific object is to provide means for converting a standard form of tractor into a combination tractor-grader machine, by removing the front or normal steering carriage of the tractor, and substituting therefor a grader supporting frame that in turn is supported by steering wheels to steer the machine.

In the specific arrangement last above mentioned the grader blade is applied to the frame and carried thereby in a position at the rear of the advanced front steering wheel unit and in front of the power unit.

The above is a brief general statement of the broader features involved in this invention, but the invention also includes various other important features essential to or highly desirable in carrying said broader features into practice. All of said novel features, both generic and specific, will be hereinafter described and defined in the claims.

In the accompanying drawings, which illustrate the invention, like characters indicate like parts throughout the several views.

Referring to the drawings:

Fig. 1 is a side elevation with some parts sectioned and some parts removed, showing the improved tractor implement designed and equipped for use as a road planer or scraper;

Fig. 2 is a detail in transverse section on the line 2—2 of Fig. 1;

Fig. 3 is a plan view of the tractor implement shown in Fig. 1;

As shown the grader attachment is applied to a tractor of the Fordson type, the construction of which is well known. Of the parts of this tractor, the numeral 9 indicates the rear traction wheels, 10 the rear axle, 11 the cast framework including the engine base and the numeral 12 the engine, which latter drives the rear traction wheels through any suitable transmission mechanism, which may be assumed to be the standard transmission mechanism of a Fordson tractor.

The elements just noted constitute the power unit of the tractor. The frame 11, at its front portion, has the customary depending forked coupling bracket 13, to which, in the normal tractor, that is, in a Fordson tractor as sold and now used, the front axle 14 is adapted to be intermediately pivoted by a pivot bolt 15. The numeral 16 indicates the front steering wheels journaled on the customary spindle arms 17 pivoted to the axle 14 and provided with arms 18 connected for parallel movements by the customary spindle connecting rod 19. One of the spindles 17 has an arm 20, to which the steering gear connecting rod 21 is pivotally connected at its front end. The front wheels, front axle and connections just described constitute the steering wheel unit of a Fordson tractor, and in the normal Fordson tractor, the axle 14 will, of course, be pivotally connected to the coupling bracket 13 by the pivot bolt 15, and the steering rod 21 then used will be the normal relatively short rod, not shown. The rod 21, illustrated, is a long substitute rod used for the arrangement illustrated as will presently appear.

For converting the normal tractor into a tractor grader such as above broadly indicated and as hereinafter described and illustrated, we provide a long so-called extension frame, which, as shown, is made up of laterally spaced parallel angle bars 22, the front ends of which are bent nearly or quite together and rigidly secured to a forked coupling bracket or head 23, to which the front axle 14, which is then removed from the coupling bracket 13, is now pivotally connected. The customary front radius rod 25 is removed with the axle 14 and its head is secured to the intermediate portion of a transverse yoke 26 hung from the frame bars 22 and braced by a rod 27 that is anchored to the coupling head or bracket 23. When the front axle 14 was coupled to the bracket 13 of the power unit, its head was anchored in a seat formed between lugs 28 on the bottom of the cast frame 11.

The rear ends of the frame bars 22 are provided with depending brackets 29 that rest on the rear axle 10 or a sleeve thereof and are rigidly clamped thereto by nut-equipped U-bolts 30. To support the front portion of the power unit from the intermediate portions of the frame bars 22, said bars 22 are provided with a rigid cross-connecting yoke 31, the depending central portion of which is placed in the fork of the coupling bracket 13 and secured thereto by the bolt 15, previously noted. Thus, the extension frame is rigidly coupled to the frame structure of the power unit and is, itself, securely braced.

The transformed tractor now described is adapted to carry and to operate various different kinds of working units, one of which is illustrated. The working unit illustrated is a road planer or scraper and comprises a scraper blade 32, which, by curved draw-bars 33, is connected to an adjusting circle or annular member 34. The circle 34 is preferably an annular angle bar, the flange of which works in keeper brackets 35 secured on the bottom of a triangular supplemental frame 36. This supplemental frame 36, at its front end, is coupled to the front end of the frame bar 22 by a link 37, and at its rear end, is supported for vertical adjustments by hanger links or rods 38, the upper ends of which are hung on the crank-like front ends 39 of rock shafts 40. These rock shafts 40 are extended longitudinally of the frame bars 22, are mounted in suitable bearings thereon and, at their rear ends, have worm gears 41 engaged by worms 42 suitably mounted on the rear portions of the frame bars 22 and arranged to be independently operated by hand wheels 43. As is evident, the opposite ends of the scraper blades 32 may be independently raised and lowered and the blades set to scrape at any desired angle by independent manipulations of the hand wheels 43. To indicate the angle at which the scraper blade is working, we provide a novel device, best illustrated in Fig. 2, by reference to which it will be noted that the two cranks 39 are connected by a telescopically extensible and contractible link made up of a tubular outer section 44 and inner member or rod 45, which link does not interfere with independent adjustments of the cranks. The numeral 46 indicates a gravity-arighted pendulum pivotally connected to the outer link member 44 at 47 and provided with a graduated dial 48. The dial 48, on opposite sides, is reversely marked in degrees from zero marks, which zero marks, when aligned with the top of the link 44, indicate that the scraper blade is working on the level or is horizontally disposed. On the pendulum 46 are graduations which indicate the depth of cut at which the scraper blade is set to work.

The scraper blade 32 is adapted to be set at any angle to scrape toward either side of the road by a lock pin 49 that is insertable through a perforation in the triangular supplemental frame 36 and through any one of a plurality of holes 50 in the circle or circular member 34.

The scraper blade 32 may take different forms; it may be straight as shown by full lines in Fig. 3, continuously curved as indicated by dotted lines 32$^a$ or reversely curved as indicated by dotted lines marked 32$^b$ on Fig. 3.

The curved blade 32$^a$ would be useful to crown a road while the reversely curved blade 32$^b$ would be useful, for example, as a snow plow.

It is desirable that means be provided for shifting the scraper blade, supplemental frame 36 and intermediate connections transversely of the tractor, and, hence, we provide a crank shaft 51 mounted in suitable bearings on one of the frame bars 22 and provided at its front end with a depending crank 52 connected by a cross link 53 to the rear portion of the supplemental frame 36. As shown, the extended end of the link 53 is pivoted on a projecting laterally bent end of one of the hanger links 38.

At its rear end, the crank shaft 51 has a worm gear 54 that is engaged by a worm not shown but located on the lower end of an upright shaft 55 journaled in a suitable bearing on the adjacent frame bar 22 and provided at its upper end with a hand wheel 56.

The advantages of the tractor-grader combination thus described and shown, over machines heretofore known and in commercial use, are many, and may be briefly referred to as follows: The tractor and grader are incorporated in one unit, and are under the control of one operator, who is not only in an advantageous position to observe the position of the blade and the condition of the road ahead of the blade, but has all the tractor and grader controls within convenient reach, whereby the machine as a whole will quickly and properly respond to each adjustment made. As the weight of the grader and grader frame is supplemented to that of the tractor, the load on the wheels 9 is greatly increased and the traction power of the tractor is correspondingly increased. Similarly, as the weight of the tractor supplements the weight of the grader it greatly increases the resistance of the scraper blade to the tendency of the dirt to push the blade sidewise off of the road, which is particularly objectionable in the tractor or horse drawn graders used heretofore. As the frame 22 must be projected forwardly from the tractor a considerable distance, so as to accommodate the blade supporting and adjusting mechanisms, the total wheel base length of the machine is much greater than in an ordinary grader or tractor alone, and consequently the blade 32 operates in a more uniform and straight path of travel, and is not as sensitive to road surface irregularities as in the single unit type of machine. The tractor may, of course, be readily detached and reconverted back into its original or normal condition, for other work or uses.

The invention having now been fully set forth, what is claimed is—

1. The combination with the power traction unit of a tractor, of a frame attached to said power unit and extending in front thereof, a steering wheel unit applied to the front portion of said extended frame, a road-working implement connected to said frame and working at the rear of said steering wheel unit but ahead of said power unit, and means for raising, lowering and angularly adjusting said road-working implement.

2. In a one man grader, in combination with not to exceed two wheel sustained axles, connected by a frame bearing power plant and an operator's station at the rear of the machine, a floating frame below the first frame loosely connected at a fixed point near the front axle, a road cutting blade carried by the floating frame forward of the power plant, and means extending to the operator's station for selectively elevating and lowering either side of the floating frame.

3. In a one man grader, in combination with not to exceed two wheel sustained axles, connected by a frame bearing power plant and an operator's station at the rear of the machine, a floating frame below the first frame loosely connected at a fixed point near the front axle, a road cutting blade carried by the floating frame forward of the power plant, and means extending to the operator's station for swinging the floating frame crosswise of the main frame.

4. In a one man grader, in combination with not to exceed two wheel sustained axles, connected by a frame bearing power plant and an operator's station at the rear of the machine, a floating frame below the first frame loosely connected at a fixed point near the front axle, a road cutting blade carried by the floating frame forward of the power plant, and means extending to the operator's station for adjusting in a horizontal plane the angle of the blade.

5. In a one man grader, in combination with not to exceed two wheel sustained axles, connected by a frame bearing power plant and an operator's station at the rear of the machine, a floating frame below the first frame loosely connected at a fixed point near the front axle, a road cutting blade carried by the floating frame, and means extending to the operator's station for selectively elevating and lowering either side of the floating frame, the blade being in such a position in front of the operator's station and power plant that, while operating any or all of said adjusting devices, the operator's eye can, without moving his head, embrace the front end of the blade, the surface of the road in profile immediately ahead of the blade, and the road a substantial distance in front of the blade.

6. In a one man grader, in combination with two wheel sustained axles, connected by a frame bearing power plant and an operator's station at the rear of the machine, a floating frame below the first frame loosely connected at a fixed point near the front axle, a road cutting blade carried by the floating frame, and means extending to the operator's station for swinging the floating frame crosswise of the main frame, the blade being in such a position in front of the operator's station and power plant that, while operating any or all of said adjusting devices, the operator's eye can, without moving his head, embrace the front end of the blade, the surface of the road in profile immediately ahead of the blade and the road a substantial distance in front of the blade.

7. In a one man grader, in combination with not to exceed two wheel sustained axles, connected by a frame bearing power plant and an operator's station at the rear of the machine, a floating frame below the first frame loosely connected at a fixed point near the front axle, a road cutting blade carried by the floating frame, and means extending to the operator's station for adjusting in a horizontal plane the angle of the blade, the blade being in such a position in front of the operator's station and power plant that, while operating any or all of said adjusting devices, the operator's eye can, without moving his head, embrace the front end of the blade, the surface of the road in profile immediately ahead of the blade and the road a substantial distance in front of the blade.

8. In a self-propelled road machine, the combination of a power plant, a wheel support for the rear of the power plant, a frame secured to and supporting the forward end of said plant, a wheeled support for the front end of said frame, a cutting blade carried in front of said plant beneath said frame, behind the front wheeled support, devices for vertically adjusting said blade, an operator's station at the rear of said power plant, and means at said station for operating said adjusting devices while the blade is under visual control of an operator at the station.

9. In a self-propelled road machine having not more than four traction wheels, the combination of a frame having a wheeled support for the front end thereof, a tractor secured to and supporting the rear end of said frame, a cutting blade mounted behind the front wheel support, in front of said tractor, for vertical, transverse and angular adjustment, and an operator's station at the rear of said tractor, means operable from said station for effecting said adjustments.

10. In a self-propelled, one-man road machine, sustained by not to exceed four wheels, the combination of a frame, a wheeled support for the front end of said frame, a power plant secured to and supported by said frame, a cutting blade supported behind the wheels in front of said power plant for vertical, transverse and angular adjustment, an operator's station at the rear of the power plant, and means operable from said station for effecting said adjustments.

11. In a self-propelled, one-man road machine carried by wheels on not more than two separated axles, the combination of a power plant comprising the rear wheels, axle, transmission and engine of a tractor, with a frame secured to and supporting said plant, a wheeled support for the front end of said frame, a cutting blade carried behind the front wheels, in front of said plant, and beneath said frame, devices for adjusting said blade into operative position, an operator's station at the rear of said power plant, and means at said station for operating said devices.

12. The combination of a road grader having steering wheels and rearwardly extending controls, a tractor provided with propelling wheels and rearwardly extending controls, an operator's station at the rear of the machine receiving all said controls and means connecting the grader and tractor in a manner permitting the tractor weight to assist the grading operation and also permitting the grader weight to lend additional traction to the tractor propelling wheels.

13. The combination of a road grader having an elongated frame provided with steering wheels at the front end and blade adjustment controls leading to the rear, a tractor, having propelling wheels, in the rear of the grader frame, its front end steered and carried by the grader frame, and means at the rear of both the grader and tractor for the simultaneous control of each.

14. A machine of the character described comprising a normal tractor having its fore-carriage removed, a frame having steering wheels at its forward end and secured at its rear end to the tractor so as to support the front end thereof, a road scraper carried by the frame, an operator's station on the machine, and means extending to within reach of the operator at said station for steering said steering wheels and for angularly adjusting said road scraper.

15. The combination with a tractor, of a grader frame secured to and extending forwardly from the tractor, a wheeled support secured to the forward end of the frame, a grader blade adjustably carried by the frame rearwardly of the support, an operator's station at the rear of the tractor and controls extending from said wheeled support and from said grader blade to within reach of the operator at said station.

16. The combination with a tractor, of a frame secured to and extending forwardly from the tractor, a wheeled support for the forward end of the frame, a grader blade adjustably carried by the frame rearwardly of the support, an operator's station, and controls extending from said wheeled support and from said grader blade to within reach of the operator at said station.

17. The combination with a tractor, of a frame secured to and extending forwardly from the tractor, a steerable support for the forward end of the frame, a grader blade adjustably carried by the frame, an operator's station, and controls extending from said steerable support and from said grader blade to within reach of the operator at said station, said frame being attached to the tractor in such a manner as to permit the weight of the frame and grader to lend additional traction to the tractor wheels.

18. The combination in a road grading machine, of a tractor having rearwardly arranged traction wheels, a frame secured to the tractor and extending forwardly thereof, steering wheels supporting the front end of the frame, a grader blade carried by said frame and arranged to operate rearwardly of the steering wheels and forwardly of the tractor, an operator's station, and controls extending from the steering wheels and from said grader blade to within reach of an operator at said station.

19. The combination in a road grading machine, of a tractor having rearwardly arranged traction wheels, a frame secured to the tractor and extending forwardly thereof, steering wheels supporting the front end of the frame, a grader blade carried by said frame and arranged to operate rearwardly of the steering wheels and forwardly of the tractor, an operator's station, and controls extending to within reach of an operator at said station for controlling the steering wheels.

20. The combination in a road grading machine, of a tractor having rearwardly arranged traction wheels, a frame secured to the tractor and extending forwardly thereof, steering wheels supporting the front end of the frame, a grader blade carried by said frame and arranged to operate rearwardly of the steering wheels and forwardly of the tractor, said tractor and frame being connected in such a manner as to permit the tractor weight to assist in the grading operation and to permit the weight of the frame and grader to lend additional traction to the traction wheels.

21. The combination with a tractor having laterally arranged traction devices, an engine for driving the traction devices, and an operator's station at the rear of the tractor, of a frame extending forwardly from the tractor with its rear end carried thereby, a ground support for the forward end of the frame, a grader blade disposed between said support and the tractor, and means, extending to within reach of an operator at said station, for vertically and angularly adjusting the grader blade.

22. The combination with a tractor having laterally arranged traction devices, an engine for driving the traction devices, and an operator's station at the rear of the tractor, of a detachable frame extending forwardly from the tractor with its forward end carried on a steering device, a grader blade adjustably carried by the frame, for vertical and angular adjustment with respect thereto, and means extending to within reach of an operator at said station for adjusting the blade.

23. The combination with a tractor having laterally arranged traction devices, an engine for driving the traction devices, and an operator's station at the rear of the tractor, of a detachable frame extending forwardly from the tractor with its forward end carried on a steering device, a transversely disposed grading tool adjustably carried by the frame, for vertical and angular adjustment with respect thereto, and control devices extending to within reach of an operator at said station, for adjusting the tool and for controlling the steering device.

24. In a one-man tractor-grader, the combination including a tractor, a grader frame extending forwardly from the tractor and having its rear end carried thereby, a steering device supporting the front end of the frame, a grader blade adjustably carried by the frame, and control devices extending to the tractor for angularly and vertically adjusting the blade.

25. A grader attachment for a tractor comprising a frame having side bars extending back for supporting attachment to the tractor, means for supporting the front end of the frame in advance of the tractor, a grader blade carried by the frame in advance of the tractor but rearwardly of the said supporting means, and means, operative from the tractor, for angularly and vertically adjusting the blade with respect to the frame.

26. A one-man power-grader comprising a frame, traction members supporting the rear end of the frame, a steering device supporting the front end of the frame, a power member for driving the traction members, a grader blade disposed below the frame and in advance of the power member but rearwardly of the steering device, an operator's station at the rear of the machine, and controls extending to within reach of the operator at said station, whereby he may observe and control the power member, steering device, and grader blade.

27. A one-man power-grader comprising a frame, traction members supporting the rear end of the frame, a steering device supporting the front end of the frame, a power member for driving the traction members, a transversely disposed grader tool arranged below the frame and in advance of the power member but rearwardly of the steering device, an operator's station at the rear of the machine, and controls extending to within reach of the operator at said station, for angularly and vertically adjusting the blade with respect to the frame.

28. The combination with a tractor, of a frame attached to the tractor and extending in front thereof, a steering wheel unit applied to and supporting the front portion of said extended frame, a road grading tool connected to said frame and working at the rear of said steering wheel unit but ahead of said power unit, and means for raising, lowering and angularly adjusting said road grading tool.

29. The combination with a tractor, of a frame attached to the tractor and extending in front thereof, a steering wheel unit applied to and supporting the front portion of said extended frame, a road grading tool connected to said frame and working at the rear of said steering wheel unit but ahead of said power unit, and controls, extending to within reach of the tractor operator, for raising, lowering and angularly adjusting said road grading tool.

30. The combination with a tractor, of a frame attached to the tractor and extending in front thereof, a steering wheel unit applied to and supporting the front portion of said extended frame, a road grading tool connected to said frame and working at the rear of said steering wheel unit but ahead of said power unit, and controls, extending to within reach of the tractor operator, for raising, lowering and angularly adjusting said road grading tool, and for steering said steering wheel unit.

31. In a self-propelled road machine, the combination of a tractor, a frame secured to and extending forwardly from the tractor, a wheeled support for the front end of said frame, a cutting blade carried in front of said plant beneath said frame and behind the front wheeled support, devices for vertically and angularly adjusting said blade, an operator's station at the rear of the tractor, and means at said station for operating said adjusting devices while the blade is under visual control of an operator at the station.

32. The combination of a road grader having an elongated frame provided with steering wheels at the front end and blade adjustment controls leading to the rear, a tractor, having propelling devices, in the rear of the grader frame and steered by the grader frame, and means at the rear of both the grader and tractor for the simultaneous control of each.

33. A road grader attachment for a tractor comprising a frame, steerable means supporting the front end of the frame, means for supportably attaching the rear end of the frame to the tractor, a road grading device carried under the frame in a position where it will operate in front of the tractor, when attached thereto, but rearwardly of the steerable means, and controls extending rearwardly of the grading device for vertically and angularly adjusting the same.

In testimony whereof we affix our signatures.

ANDREAN G. RONNING.
ADOLPH RONNING.